(12) United States Patent
Han

(10) Patent No.: US 12,275,489 B2
(45) Date of Patent: Apr. 15, 2025

(54) MULTI-SPEED TRANSMISSION

(71) Applicant: Eun Su Han, Hwaseong-si (KR)

(72) Inventor: Eun Su Han, Hwaseong-si (KR)

( * ) Notice: Subject to any disclaimer, the term of this patent is extended or adjusted under 35 U.S.C. 154(b) by 0 days.

(21) Appl. No.: 18/279,873

(22) PCT Filed: Feb. 25, 2022

(86) PCT No.: PCT/KR2022/002833
§ 371 (c)(1),
(2) Date: Sep. 1, 2023

(87) PCT Pub. No.: WO2022/203221
PCT Pub. Date: Sep. 29, 2022

(65) Prior Publication Data
US 2024/0158046 A1 May 16, 2024

(30) Foreign Application Priority Data

Mar. 20, 2021 (KR) .................. 10-2021-0036288
Feb. 25, 2022 (KR) .................. 10-2022-0025439

(51) Int. Cl.
*B62M 11/04* (2006.01)
*B62M 9/10* (2006.01)
(Continued)

(52) U.S. Cl.
CPC .............. *B62M 11/04* (2013.01); *B62M 9/10* (2013.01)

(58) Field of Classification Search
CPC ........ F16H 3/083; F16H 3/089; F16H 31/005; B62M 11/04; B62M 9/10
(Continued)

(56) References Cited

U.S. PATENT DOCUMENTS 5,454,766 A * 10/1995 Mills ....................... F16H 29/16
280/238
6,354,976 B1 * 3/2002 Mills ....................... B62M 11/16
74/117
(Continued)

FOREIGN PATENT DOCUMENTS

JP 2007-024080 A 2/2007
KR 10-1223566 B1 1/2013
(Continued)

OTHER PUBLICATIONS

International Search Report for PCT/KR2022/002833 mailed Jun. 2, 2022 from Korean Intellectual Property Office.

*Primary Examiner* — Ha Dinh Ho
(74) *Attorney, Agent, or Firm* — Revolution IP, PLLC

(57) ABSTRACT

A multi-speed transmission includes a driving shaft that rotates as a rotational force is input; a plurality of driving gears which are coupled to the driving shaft and rotate by the rotation of the driving shaft; a plurality of transmission gears which is engaged with the driving gear; a transmission shaft which includes a plurality of pawl assemblies that are at least partially moved inward and outward on an outer peripheral surface, is coupled with the transmission gear, and is selectively coupled with at least a part of the transmission gear; a transmission control means for selectively controlling the inward and outward movement of at least a part of the pawl assembly; a plurality of driven gears which are engaged with at least a part of the transmission gears; and a driven shaft which is coupled with the plurality of driven gears.

9 Claims, 7 Drawing Sheets

(51) Int. Cl.
   *F16H 3/083*   (2006.01)
   *F16H 3/089*   (2006.01)
   *F16H 31/00*   (2006.01)

(58) Field of Classification Search
   USPC .......................................................... 74/337.5
   See application file for complete search history.

(56) References Cited

U.S. PATENT DOCUMENTS

| | | | |
|---|---|---|---|
| 2007/0062318 A1* | 3/2007 | Chang | F16H 3/089 74/325 |
| 2009/0255356 A1* | 10/2009 | Hartmann | F16H 3/083 74/331 |
| 2014/0053671 A1* | 2/2014 | Matsumoto | F16H 3/08 74/335 |
| 2016/0053863 A1 | 2/2016 | Glover et al. | |
| 2016/0258511 A1* | 9/2016 | Yamada | F16H 3/10 |
| 2021/0172502 A1 | 6/2021 | Han | |

FOREIGN PATENT DOCUMENTS

| | | | | |
|---|---|---|---|---|
| KR | 10-2013-0039350 A | 4/2013 | | |
| KR | 10-2018-0065679 A | 6/2018 | | |
| KR | 10-2020-0006276 A | 1/2020 | | |
| WO | WO-2010072397 A1 * | 7/2010 | | B62M 11/06 |

* cited by examiner

[Figure 1]
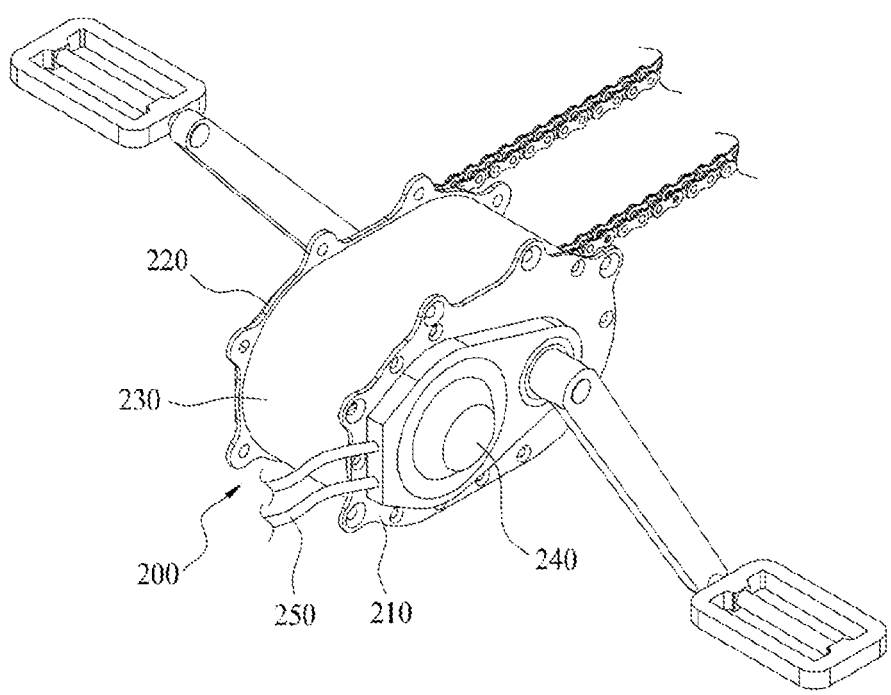

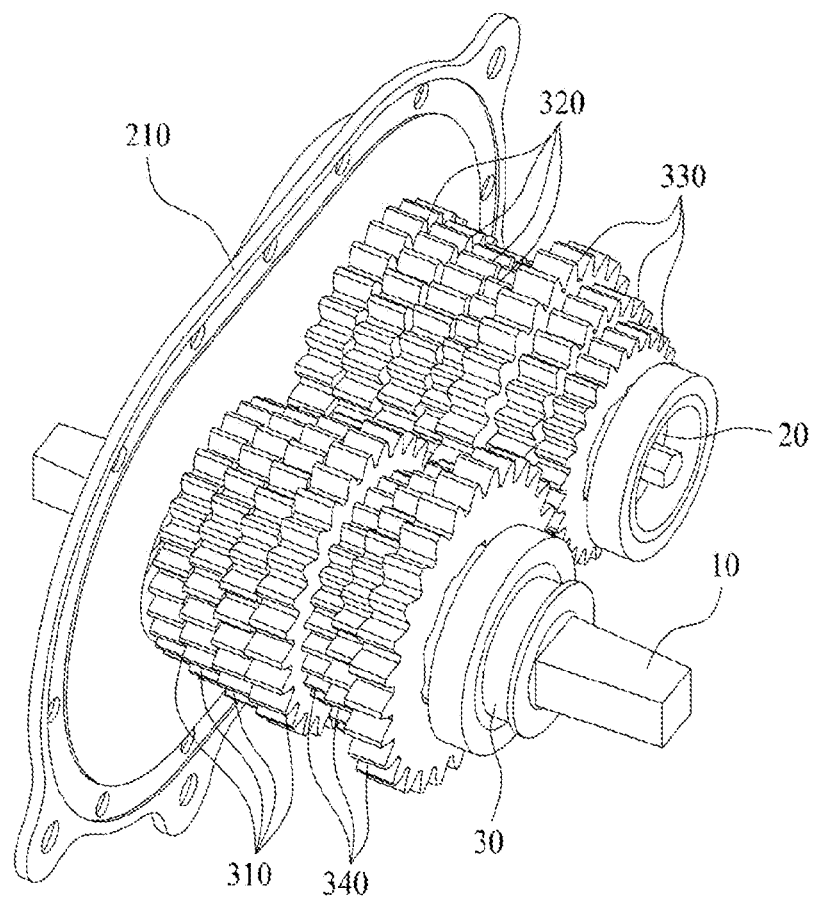
【Figure 2】

[Figure 3]
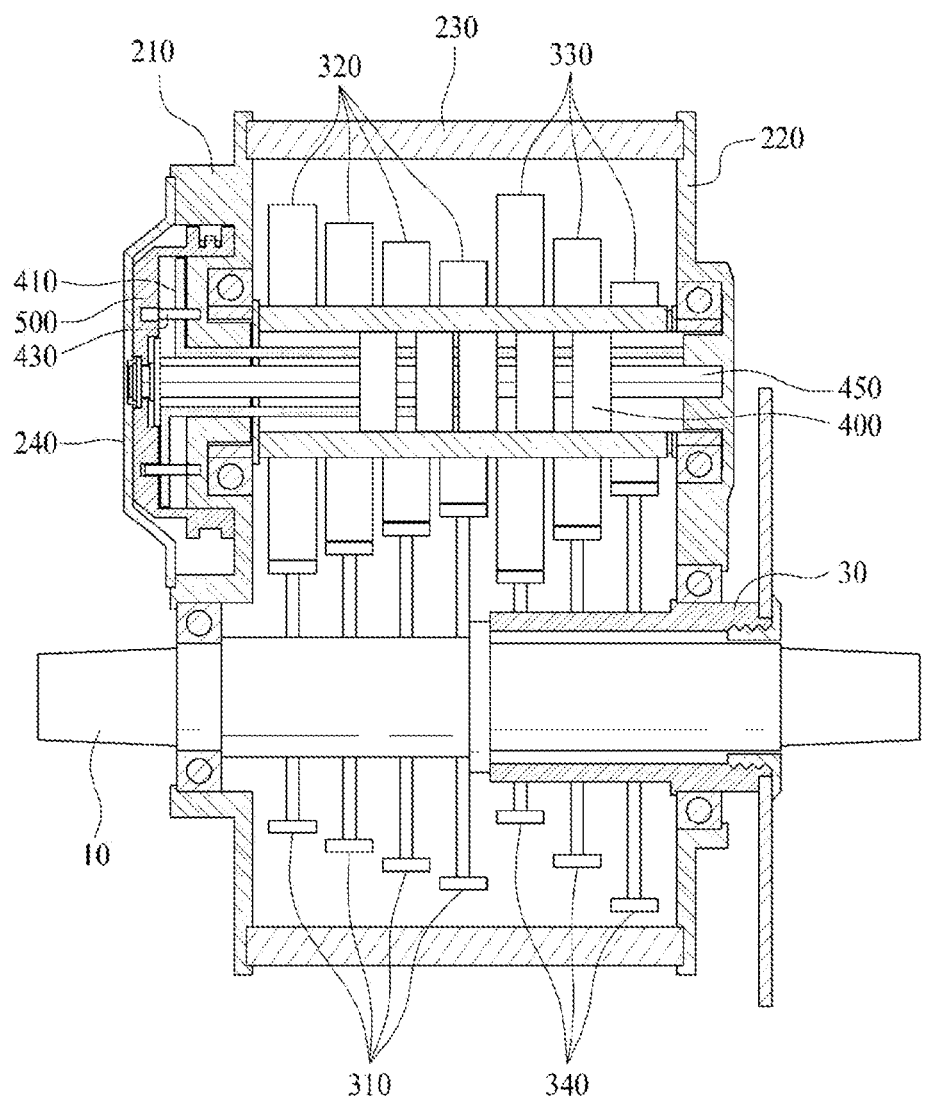

[Figure 4]
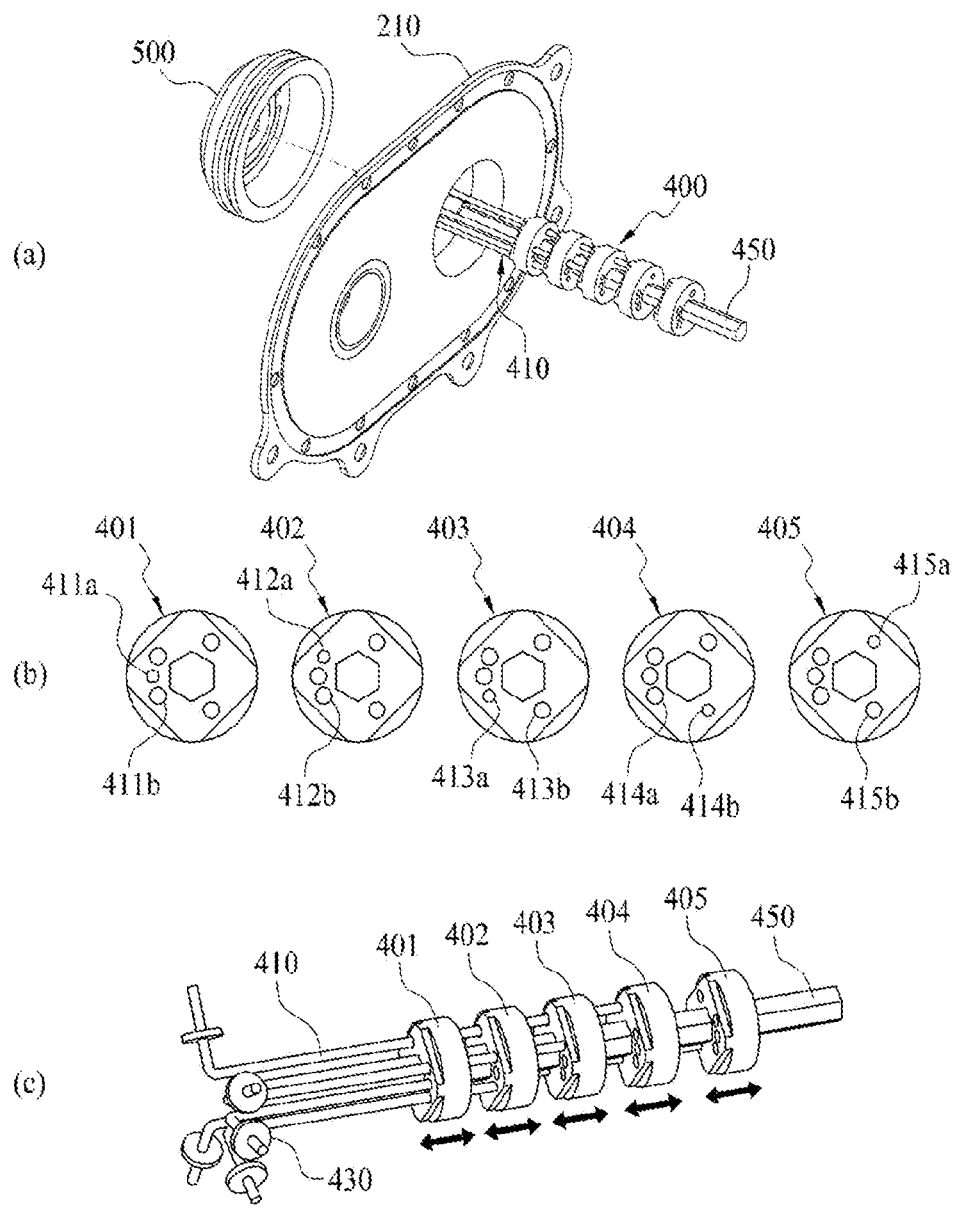

[Figure 5]
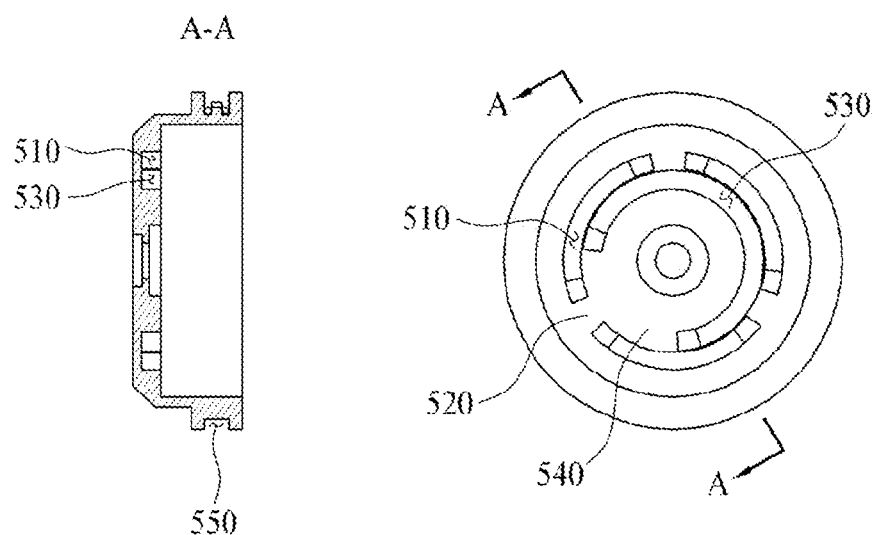
[Figure 6]
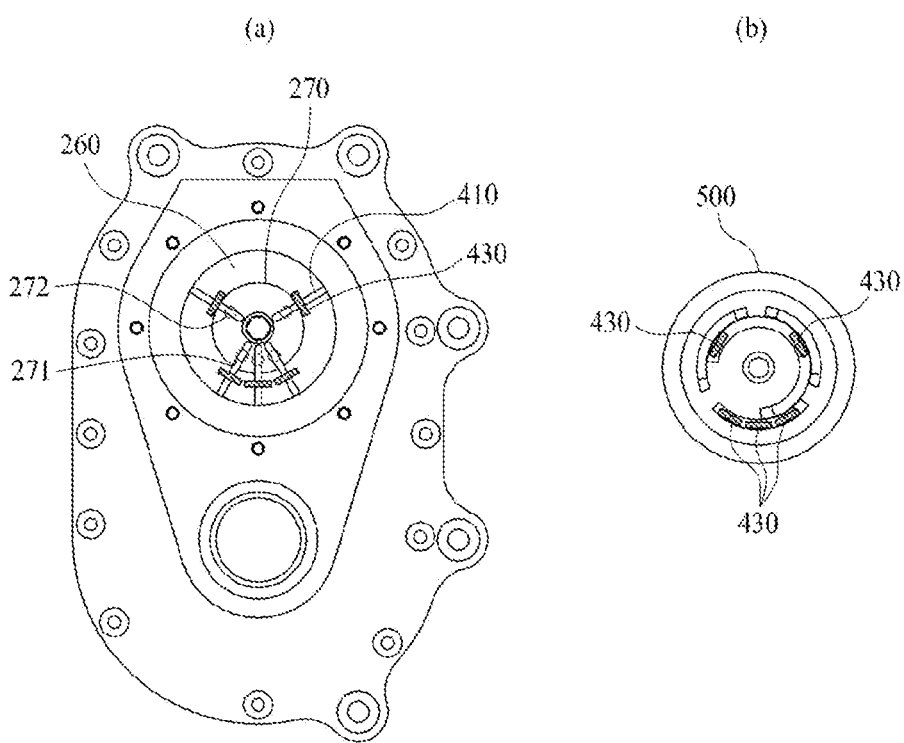

【Figure 7】
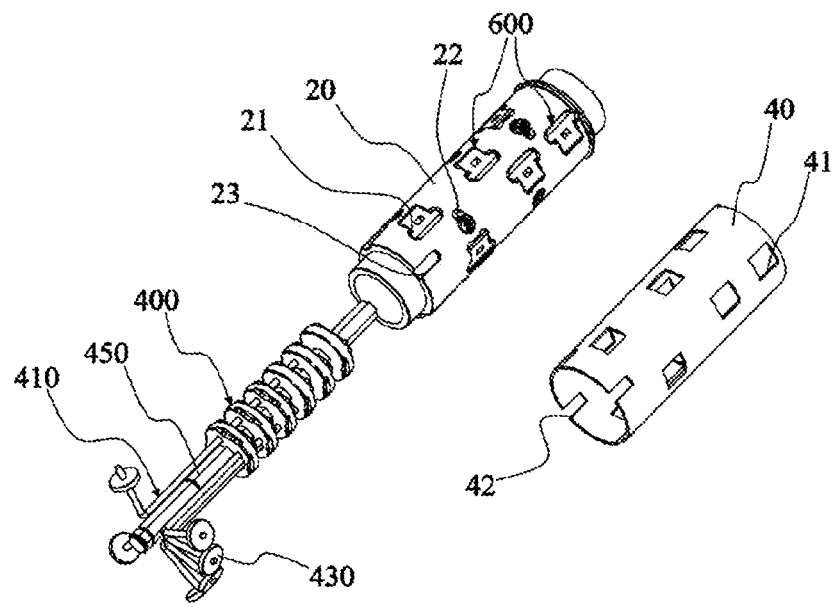
【Figure 8】
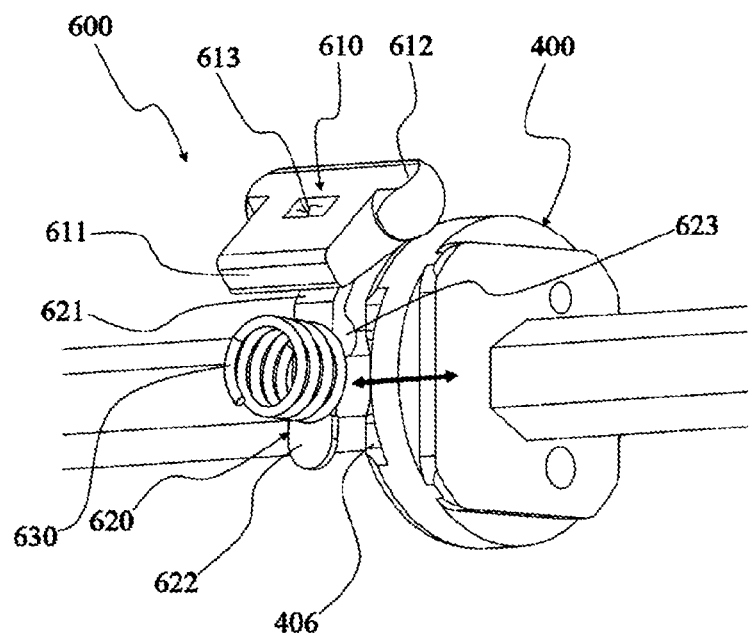

【Figure 9】
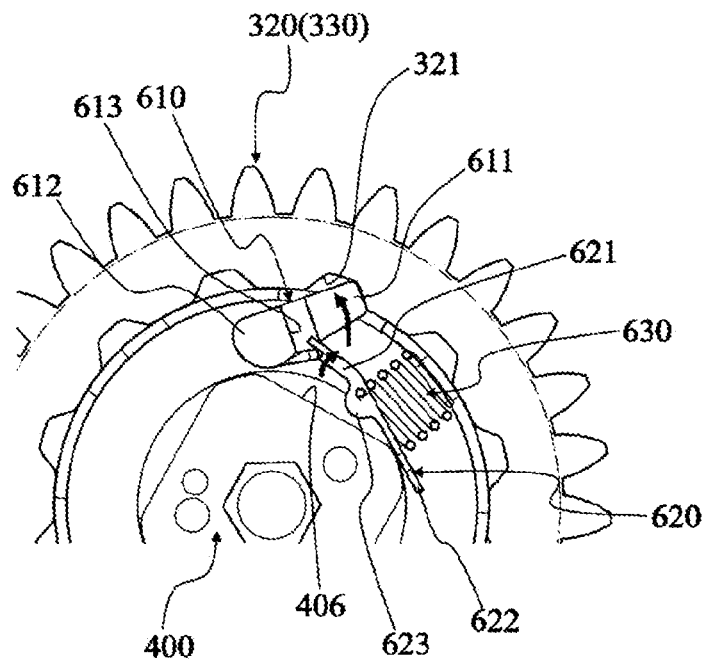
【Figure 10】
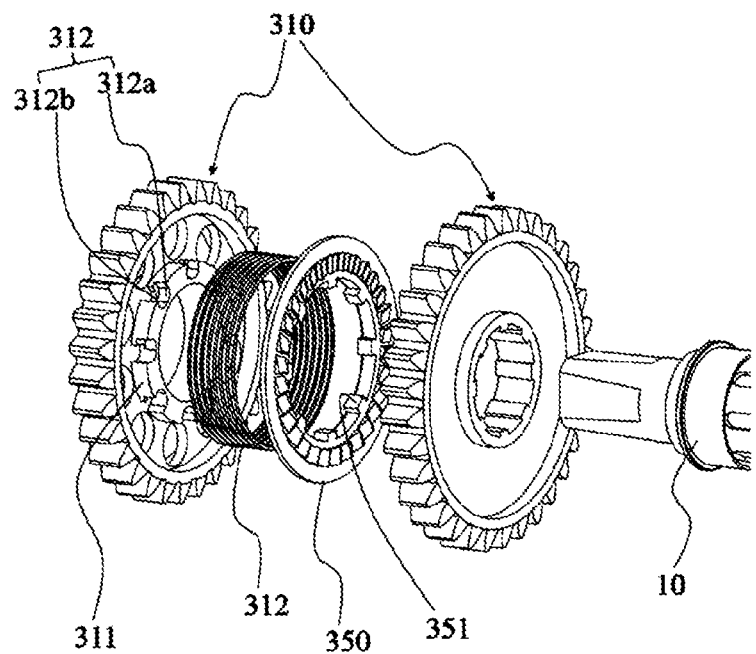

MULTI-SPEED TRANSMISSION

TECHNICAL FIELD

The present invention relates to a multi-speed transmission, and more particularly, a multi-speed transmission in which transmission gears are coupled to one shaft and a driving shaft and a driven shaft are coaxially positioned to have excellent spatial efficiency.

BACKGROUND ART

Contents described in this part merely provides background information of the present invention, but does not constitute the related art.

In the conventional multi-speed transmission, because both a transmission sprocket and a chain were manufactured to be exposed to the outside, there was a problem that the binding force between the sprocket and the chain was lowered due to dust, and the chain was easily detached from the sprocket. For this reason, a gearbox-type transmission has been manufactured in which the sprocket or gear was wrapped in a case so as not to be exposed to the outside. However, because the conventional gearbox-type multi-speed transmission had drawbacks in that the internal transmission gears were needed to be coupled by a plurality of shafts, and thus, the manufacturing cost and time increased, and the space efficiency was low.

Therefore, the applicant has solved these problems and proposed a multi-speed transmission that occupies a small space while reducing the manufacturing cost and time and has good space efficiency. Accordingly, a method for solving such problems is required.

DISCLOSURE

Technical Problem

Examining a bicycle transmission which is the related above-mentioned prior art (Korean Patent No. 10-1223566), although there is an advantage that all the gears are included inside one box and are not polluted by dust, various greats need to be coupled with different shafts from each other, and therefore, there are drawbacks such as bulkiness and low space efficiency.

Accordingly, the problem to be solved by the present invention has an object of providing a multi-speed transmission that compensates for the above-mentioned drawbacks of the related art.

The objects of the present invention are not limited to the above objects, and other objects not mentioned will be clearly understood by those skilled in the art from the following description.

Technical Solution

A multi-speed transmission of the present invention for achieving the above object includes a driving shaft that rotates as a rotational force is input; a plurality of driving gears which are coupled to the driving shaft and rotate by the rotation of the driving shaft; a plurality of transmission gears which is engaged with the driving gear; a transmission shaft which includes a plurality of pawl assemblies that are at least partially moved inward and outward on an outer peripheral surface, is coupled with the transmission gear, and is selectively coupled with at least a part of the transmission gear in accordance with the inward and outward movement of at least a part of the pawl assemblies; a transmission control means for selectively controlling the inward and outward movement of at least a part of the pawl assembly; a plurality of driven gears which are engaged with at least a part of the transmission gears; and a driven shaft which is coupled with the plurality of driven gears and transmits rotational force to an object to be driven.

At this time, the driven shaft may include a hollow portion capable of accommodating at least a part of the driving shaft, and may be coupled to ab outer peripheral surface of the driving shaft to idle.

Further, the transmission control means may include a plurality of guide members which are disposed in the hollow portion of the transmission shaft, moved along a longitudinal direction of the transmission shaft, and selectively come into contact with a part of the pawl assemblies to guide the inward and outward movement of a part of the pawl assemblies; a plurality of guide rods each connected to the plurality of guide members on one side; a wire for transmitting; and a transmission channel which is rotatable by the wire, and includes a transmission guide groove formed to have a predetermined radius and length, in which the other sides of the plurality of guide rods each may come into contact with the transmission channel, and may be selectively inserted into the transmission guide grooves by rotation of the transmission channel to selectively move the guide member.

In addition, a plurality of the guide members may be disposed coaxially side by side, and each one guide member may include one coupling hole to which the guide rod is coupled; and one or more through-holes which are located to be adjacent to the coupling hole, and through which a guide rod coupled with another guide member is able to pass, and the coupling holes may be disposed to be offset from each other.

The guide member may include a seating part including a seating slope configured so that a part of the pawl assemblies is able to seat.

Further, a plurality of first insertion holes and second insertion holes arranged along the longitudinal direction of the transmission shaft may be formed on a peripheral surface of the transmission shaft, and the pawl assemblies may include a first pawl member which is rotatably provided in the first insertion hole and formed so that at least a part thereof is selectively exposed to the outside of the transmission shaft; an elastic member inserted into the second insertion hole; and a second pawl member which includes a first contact part that comes into contact with the first pawl member, a second contact part that comes into contact with the elastic member, and a seating protrusion that is formed to protrude in an inward direction between the first contact part and the second contact part, and formed to selectively come into contact with the seating slope in accordance with movement of the guide member, and when the seating protrusion is seated on the seating slope, as the first contact part exerts an external force to the first pawl member, at least a part of the first pawl member may be exposed to the outside and locked to a locking groove formed on an inner side of the transmission gear.

Here, the present invention may further include a shaft cover which is formed to wrap around the transmission shaft, and has a communication hole communicating with the first insertion hole.

Also, the present invention may further include a pull-in member which is disposed on the other side of the guide rod, and selectively pulled into the transmission guide groove.

The pull-in member may be formed in a ring shape including a hollow portion, and the hollow portion may be coupled to the other side of the guide rod.

Meanwhile, the transmission gear may include a first transmission gear unit engaged with the driving gear; and a second transmission gear unit which is disposed coaxially with the first transmission gear unit, and engaged with the driven gear, in which the transmission gears of the first transmission gear unit and the second transmission gear unit may have different dimensions from each other.

In addition, the present invention further includes a ratchet that prevents reverse rotation of the driving gears between the plurality of driving gears and has a fixing protrusion formed on an inner peripheral surface thereof, in which among the plurality of driving gears, a driving gear to which the ratchet is fixed may be formed so that a fixing part in which a fixing groove, into which the fixing protrusion is inserted, is formed along a circumference protrudes in a lateral direction.

At this time, the fixing groove may be formed with a step inside, and may have a shape in which a first fixing groove of a first depth and a second fixing groove of a second depth formed at a position deeper than the first depth are continuously connected.

Advantageous Effects

In order to solve the above-mentioned problems, the multi-speed transmission of the present invention has the advantage that the transmission gears are coupled with on one shaft together and the driving shaft and the driven shaft are coaxially positioned, and thus, the space efficiency is excellent.

The multi-speed transmission according to the invention also has the advantage that the number of shafts required is significantly less, which can greatly reduce the manufacturing costs and time.

The effects of the present invention are not limited to the effects described above, and other effects not mentioned will be clearly understood by those skilled in the art from the description of the claims.

DESCRIPTION OF DRAWINGS

FIG. 1 is a perspective view of a multi-speed transmission according to an embodiment of the present invention.

FIG. 2 is a perspective view of a gear unit of the multi-speed transmission according to an embodiment of the present invention.

FIG. 3 is a plan view of the gear unit of the multi-speed transmission according to an embodiment of the present invention.

FIG. 4 is a perspective view (a) of a transmission control means of the multi-speed transmission according to an embodiment of the present invention, and detailed views (b, c) of each configuration of the transmission control means.

FIG. 5 is a side view and a plan view of a transmission channel of the multi-speed transmission according to an embodiment of the present invention.

FIG. 6 is a diagram which shows a guide rod and retraction member and transmission channel of the multi-speed transmission according to an embodiment of the present invention.

FIG. 7 is a diagram showing a coupling structure between a transmission shaft and related components in the multi-speed transmission according to an embodiment of the present invention.

FIGS. 8 and 9 are diagrams showing a driving principle of a pawl assembly in the multi-speed transmission according to an embodiment of the present invention.

FIG. 10 is a diagram showing a coupling structure between a driving gear and a ratchet in the multi-speed transmission according to an embodiment of the present invention.

BEST MODE

Preferred embodiments of the present invention, which can specifically achieve the object of the present invention, will be described below with reference to the accompanying drawings. In describing the present embodiment, the same configurations are denoted by the same names and the same reference numerals, and the additional description associated therewith will not be provided.

FIG. 1 is a perspective view of a multi-speed transmission according to an embodiment of the present invention.

FIG. 2 is a perspective view of the gear unit of the multi-speed transmission according to an embodiment of the present invention, and FIG. 3 is a plan view of the gear unit of the multi-speed transmission according to an embodiment of the present invention.

Referring to FIGS. 1 to 3, a multi-speed transmission 100 according to an embodiment of the present invention may include a driving shaft 10, a case 200, and an input pedal connected to the driving shaft 10. The case 200 accommodates a gear unit included therein, and may include a first cover 210, a second cover 220, a body cover 230, and a transmission channel cover 240.

Additionally, a wire 250 for rotating a transmission channel to be described below may be included.

Further, referring to FIGS. 2 and 3, the multi-speed transmission according to an embodiment of the present invention may include gear units 310 to 340, which are sets of gears.

The gear units 310 to 340 may include a driving gear 310, transmission gears 320 and 330, and a driven gear 340. In addition, it may include a driving shaft 10, a transmission shaft 20, a driven shaft 30, and transmission control means for controlling the transmission.

The driving shaft 10 is rotated as a rotational force is input, and a plurality of driving gears 310 may be included and may be coupled to the driving shaft 10 to rotate as the driving shaft 10 rotates. That is, the driving gear 310 does not idle on the driving shaft 10. The driving gear 310 may transmit the input rotational force to the transmission gears 320 and 330. As shown in the drawings, the driving gear 310 may be configured to have a number of different dimensions.

The transmission gears 320 and 330 may include a first transmission gear unit 320 and a second transmission gear unit 330.

The first transmission gear unit 320 is engaged with the driving gear 310 and may have different dimensions, and the second transmission gear unit 330 is coaxially disposed with the first transmission gear unit 320, is engaged with the driven gear 340 and can be configured to have different dimensions.

The first transmission gear unit 320 and the second transmission gear unit 330 may be configured to idle with the transmission shaft 20 or to be selectively engaged with the transmission shaft 20. Only a target gear among the plurality of transmission gears 320 and 330 can be configured to be engaged with the transmission shaft 20 to achieve the target gear configuration ratio. For this purpose, at least one of the first transmission gear units 320 engaged with the driving gear 310 and at least one of the second transmission gear unit 330 engaged with the driven gear 340 can be configured to be engaged with the transmission shaft 20. At least two gears among the transmission gears 320 and 330 are engaged with the transmission shaft 20 as a whole.

However, the gear with the largest diameter located on the leftmost side of the first transmission gear unit 320 and the gear with the smallest diameter located on the rightmost side of the second transmission gear unit 330 can each be configured to be always coupled to the transmission shaft 20. The gear with the largest diameter located on the leftmost side of the first transmission gear unit 320, and the gear with the smallest diameter located on the rightmost side of the second transmission gear unit 330 correspond to the lowest stage gear configuration ratio that can generate the lowest gear. That is, the lowest gear ratio is configured to be set to a default value so that the vehicle can operate at the lowest gear ratio even without shifting.

That is, in a state in which only the gear with the largest diameter located on the leftmost side of the first transmission gear unit 320, and the gear with the smallest diameter located on the rightmost side of the second transmission gear unit 330 are engaged with the transmission shaft 20, the gear ratio is set to the lowest gear is set, and along with this, when another gear of the first transmission gear unit 320 or another gear of the second transmission gear unit 330 is additionally coupled to the transmission shaft 20, the stage may be variable.

The transmission shaft 20 can be selectively coupled to with at least a part of the transmission gears 320 and 330. For this purpose, the transmission shaft 20 may include a plurality of pawl assemblies 600 (see FIGS. 7 to 9) having a structure that moves inward and outward on the outer peripheral side, and may have an insertion hole to which the pawl assemblies are coupled. The pawl 600 and insertion hole will be described in detail later.

The transmission shaft 20 includes a hollow which may include a plurality of guide members 400 that move along a longitudinal direction of the transmission shaft 20 to selectively come into contact with the plurality of pawl assemblies 600 and guide the inward and outward movement of components included in the pawl assemblies 600. Although the details will be described later, the transmission gears 320 and 330 can be configured to be selectively coupled to the transmission shaft 20 in accordance with the selective forward and rearward movement of the guide member 400 so as to perform the transmission control.

The driven gear 340 may be engaged with at least a part of the transmission gears 320 and 330, preferably, the second transmission gear unit 330.

The driven shaft 30 can be coupled to the driven gear 340 so as not to idle. The driven shaft 30 can be coupled to an outer peripheral surface of the driving shaft 10 to idle, including a hollow portion capable of accommodating at least a part of driving shaft 10. The driven shaft 30 can have a separate sprocket attached to the outside and can serve to transmit rotational force to the driven object via a chain.

In this way, the driven shaft 30 can be disposed coaxially with the driving shaft 10 other than a separate shaft, and coupled to the outer peripheral surface of the driving shaft 10 to idle, thereby maximizing the efficiency of space utilization. FIG. 4 is a perspective view (a) of a transmission control means of a multi-speed transmission according to an embodiment of the present invention, and detailed views (b, c) of each configuration of the transmission control means.

FIG. 5 is a side view and a plan view of a transmission channel of the multi-speed transmission according to an embodiment of the present invention.

FIG. 6 is a diagram showing a guide rod, a retraction member and a transmission channel of the multi-speed transmission according to an embodiment of the present invention.

FIG. 7 is a diagram showing a coupling operation of the transmission gear according to movement of a guide member of the multi-speed transmission according to an embodiment of the present invention.

Referring to FIGS. 4 to 7, the transmission control means can control transmission through selective coupling between the transmission shaft 20 and the transmission gears 320 and 330.

The transmission control means may include a wire, a transmission channel 500, a guide member 400 and a pawl 600. Additionally, a guide rod 410 and a pull-in member 430 for connecting the guide member 400 and the transmission channel 500 may be included.

First, a general mechanism of operation of the transmission control means will be described. The transmission channel 500 rotates by operation of the wire, the guide rod 410 moves back and forth along the direction of the transmission shaft 20 by the rotation of the transmission channel 500, the guide member 400 moves back and forth accordingly, the guide member 400 selectively comes into contact with at least some pawl assemblies 600 among the plurality of pawl assemblies 600 provided on the transmission shaft 20 according to the back and forth movement of the guide member 400 to change the arrangement angle of the pawl assembly 600, and at least some gears among the transmission gears 320 and 310 to 340 located on the same line as the pawl assembly 600 according to the change in the arrangement angle of the pawl assembly 600 are configured to be engaged and coupled with the transmission shaft 20 such that a target gear configuration ratio is set.

Here, the left three members (401 to 403) of the guide member 400 on the drawing interact with the three right gears of the first transmission gear unit 320, and the right two members on the drawing can be disposed and configured to interact with the left two (404-405) gears of the second transmission gear unit 330.

First, referring to FIG. 5, a transmission channel 500 can be rotated by a wire, and can include transmission guide grooves 510 and 530 formed therein with a predetermined radius and length.

The transmission guide grooves 510 and 530 may include a first transmission guide groove 510 and a second transmission guide groove 530.

The first transmission guide groove 510 is located on a relatively outer concentric circle, but may be divided and made up of three grooves.

The second transmission guide groove 530 is located on a relatively inner concentric circle, but may be made up of a single groove.

As shown in the drawings, the first transmission guide grooves 510 may be disposed such that the center-to-center angle of the three grooves forms 120° on the basis of the center of the circle.

The second transmission guide groove 530 may be disposed so that one continuous groove is adjacent to the first transmission guide groove 530.

Although details will be described later, the guide rod 410 or the pull-in member 430 is selectively inserted into the transmission guide grooves 510 and 530 by the rotation of the transmission channel 500 including the transmission guide grooves 510 and 530 formed as described above, and the guide member can be moved back and forth along the direction of the transmission shaft 20.

Next, referring to FIG. 4, the configurations of the guide member 400, the guide rod 410, the pull-in member 430 and the guide shaft 450 can be grasped.

The guide member 400 may be formed of a plurality of members 401 to 405, as shown in FIG. 4(*b*). However, although five members are shown in the drawings, the number is not necessarily limited thereto, and the number may be changed as necessary, and may be at least two or more.

Each of the guide members 400, and 401 to 405 can include one coupling hole 410*a*, and 411*a* to 415*a* and one or more through-holes 410*b*, and 411*b* to 415*b*.

A hollow formed through which the guide shaft 450 can pass may be included at the center of each guide member 400.

The guide rod 410*a* may be coupled to the coupling hole 410*a*. As described above, the guide rod 410 may serve to guide axial forward and backward movement of the guide member 400 in accordance with rotation of the transmission channel 500.

The through-hole 410*b* can be configured so that the guide rod 410 coupled with another guide member 400 passes.

As the guide member 400 is configured in this way, as shown in FIG. 3(*c*), the plurality of guide members 401 to 405 are disposed coaxially side by side, and can move back and forth along the direction of the guide shaft 450 while sliding on the guide shaft 450.

The guide rods 411 to 415 may have different lengths from each other. One side of the guide rods 411 to 415 is each coupled to the guide members 401 to 405, and the other side of the guide rods 411 to 415 can come into contact with the transmission channel 500. The other side of the guide rods 411 to 415 can be formed by bending once vertically in the longitudinal direction, and the pull-in member 430 can be provided at the bent portion.

The pull-in member 430 is formed in a ring shape including a hollow portion, and the hollow portion can be coupled to the bent portion on the other side of the guide rods 411 to 415. The pull-in member 430 can be selectively pulled/inserted into the transmission guide grooves 510 and 530 with rotation of the transmission channel 500.

Referring to FIG. 6, it can be understood that the guide rod 410 and the pull-in member 430 are disposed on one side of the first cover 210 as shown.

The transmission channel coupling unit 260 may be formed on the outer surface of the first cover 210. The transmission channel coupling unit 260 may be formed in a shape that allows the transmission channel 500 to be coupled to and seated in the transmission channel coupling unit 260.

A guide member 270 including a plurality of guide grooves 271 in which at least a part of the guide rod 410 is seated and can move back and forth may be included at the center of the transmission channel coupling unit 260. A lower end of the guide groove 271 may include an elastic member 272 that exerts force on each guide rod 410 outward, i.e., toward the transmission channel 500.

The transmission channel coupling unit 260 may include a plurality of extension guide grooves extending from each guide groove 271 of the guide member 270 and formed to the edge of the transmission channel coupling unit 260. The extension guide grooves are formed to accommodate both the guide rod 410 and the pull-in member 430, and may be formed at a predetermined depth so as not to interfere with the back and forth movement of the guide rod 410 and the pull-in member 430.

Referring to FIG. 6 again, it can be understood that each pull-in member 430 is seated in the transmission guide grooves 510 and 530 of the transmission channel 500. In the drawing, at least a part of the guide member 400 is selectively moved back and forth, by an operation in which each pull-in member 430 does not rotate, and the transmission channel 500 rotates so that at least a part of each pull-in member 430 is selectively inserted or not inserted into the transmission guide grooves 510 and 530.

FIG. 7 is a diagram showing a coupling structure of a transmission shaft 20 and related components in a multi-speed transmission according to an embodiment of the present invention, and FIGS. 8 and 9 are diagrams showing the driving principle of the pawl assembly 600 in the multi-speed transmission according to an embodiment of the present invention.

As shown in FIGS. 7 to 9, a plurality of first insertion holes 21 and second insertion holes 22 arranged along the longitudinal direction of the transmission shaft 20 can be formed on the peripheral surface of the transmission shaft 20 in this embodiment.

At this time, the pawl assembly 600 includes a first pawl member 610 which is rotatably provided in the first insertion hole 21 and at least a part of which is formed to be selectively exposed to the outside of the transmission shaft 20, an elastic member 630 inserted into the insertion hole 22, and a second pawl member 620.

Specifically, the first pawl member 610 includes a shaft providing part 612 that provides a rotation shaft, and a locking part 611 which is selectively exposed to the outside of the transmission shaft 20 when the first pawl member 610 rotates around the shaft providing part 612.

The second pawl member 620 has a first contact part 621 that comes into contact with the first pawl member 610, a second contact part 622 that comes into contact with the elastic member 630, and a seating protrusion 623 which is formed to protrude inward between the first contact part 621 and the second contact part 622, and is formed to selectively come into contact with the seating slope 406 in accordance with the movement of the guide member 400.

As a result, when the guide member 400 moves and the seating protrusion 623 is seated on the seating slope 406 as shown in FIG. 9, as the first contact part 621 exerts the external force to the first pawl member 610, the locking part 611 of the first pawl member 610 is exposed to the outside and caught in the locking groove 321 formed inside the transmission gears 320 and 330, thereby transmitting power.

That is, as mentioned above briefly, the lowest gear is set to a default value to be always engaged. In this state, when a part of another transmission gear selected by the operation of the pawl assembly 600 is coupled with the transmission shaft 20, the transmission is changed according to the gear composition ratio corresponding to the selected transmission gear. In other words, since the lowest gear corresponds to the gear configuration ratio that produces the lowest speed, if the higher gear that produces higher speeds engages and rotates together, the low speed may be ignored, and there is no effect on transmission.

On the other hand, as shown in FIG. 7, the present embodiment may further include a shaft cover 40 which is formed to wrap around the transmission shaft 20 and formed with a communication hole 41 communicating with the first insertion hole 21. The shaft cover 40 may be provided to reinforce the transmission shaft 20 and assist driving of the pawl assembly 600 smoothly.

In this embodiment, a first gear fixing groove 23 can be formed on one side of the transmission shaft 20, and a second gear fixing groove 42 communicating with the first gear fixing groove 23 can be formed on one side of the shaft cover 40.

This is intended to be coupled with the protrusion formed on the inner peripheral surface side of the gear with the largest diameter located on the leftmost side of the first transmission gear unit 320, so that the gear with the largest diameter located at the leftmost side of the first transmission gear unit 320 can be basically fixed to the transmission shaft 20.

FIG. 10 is a diagram showing a coupling structure between the driving gear 310 and a ratchet 350 in the multi-speed transmission according to an embodiment of the present invention.

As shown in FIG. 10, the present embodiment may further include the ratchet 350 that prevents the driving gears 310 from moving backward between the plurality of driving gears 310, and has a fixed protrusion 351 formed on the inner peripheral surface thereof. A restoring elastic member 312 for providing a restoring force between the ratchet 350 and the driving gear 310 may be provided between the ratchet 350 and the driving gear 310.

At this time, the driving gear 310 to which the ratchet 350 is fixed among the plurality of driving gears 310 can be formed such that a fixing part 311 in which a fixing groove 312, into which the fixing protrusion 351 is inserted, is formed along the circumference protrudes in the lateral direction.

The fixing groove 312 has a step inside, and can have a shape in which the first fixing groove 312a of a first depth and the second fixing groove 312b of a second depth formed at a position deeper than the first depth are continuously connected, and this is for improving the coupling force by causing the fixing protrusion 351 to be inserted into the fixing groove 312 step by step according to the coupling depth.

Various modifications and variations may be made without departing from the spirit and scope of the invention. Accordingly, the appended claims shall include such modifications or variations insofar as they fall within the spirit of the present invention.

The invention claimed is:

1. A multi-speed transmission, comprising:
a driving shaft that rotates as a rotational force is input;
a plurality of driving gears which are coupled to the driving shaft and rotate by the rotation of the driving shaft;
a plurality of transmission gears which are engaged with the driving gears;
a transmission shaft which includes a plurality of pawl assemblies that are at least partially moved inward and outward on an outer peripheral surface, is coupled with the transmission gears, and is selectively coupled with at least a part of the transmission gears in accordance with the inward and outward movement of at least a part of the pawl assemblies;
a transmission control means for selectively controlling the inward and outward movement of at least a part of the pawl assemblies;
a plurality of driven gears which are engaged with at least a part of the transmission gears; and
a driven shaft which is coupled with the plurality of driven gears and transmits rotational force to an object to be driven,
wherein the transmission control means comprises:
a plurality of guide members which are disposed in a hollow portion of the transmission shaft, moved along a longitudinal direction of the transmission shaft, and selectively come into contact with a part of the pawl assemblies to guide the inward and outward movement of a part of the pawl assemblies;
a plurality of guide rods each connected to the plurality of guide members on one side;
a wire for transmitting; and
a transmission channel which is rotatable by the wire, and includes a transmission guide groove formed to have a predetermined radius and length,
wherein the other sides of the plurality of guide rods each come into contact with the transmission channel, and are selectively inserted into the transmission guide grooves by rotation of the transmission channel to selectively move the guide member,
wherein the guide member comprises a seating part including a seating slope configured so that a part of the pawl assemblies is able to seat, and
wherein a plurality of first insertion holes and second insertion holes arranged along the longitudinal direction of the transmission shaft are formed on a peripheral surface of the transmission shaft, and
the pawl assemblies comprise:
a first pawl member which is rotatably provided in the first insertion hole and formed so that at least a part thereof is selectively exposed to the outside of the transmission shaft;
an elastic member inserted into the second insertion hole; and
a second pawl member which includes a first contact part that comes into contact with the first pawl member, a second contact part that comes into contact with the elastic member, and a seating protrusion that is formed to protrude in an inward direction between the first contact part and the second contact part, and formed to selectively come into contact with the seating slope in accordance with movement of the guide member,
wherein when the seating protrusion is seated on the seating slope, as the first contact part exerts an external force to the first pawl member, at least a part of the first pawl member is exposed to the outside and locked to a locking groove formed on an inner side of the transmission gears.

2. The multi-speed transmission according to claim 1, wherein the driven shaft comprises a hollow portion capable of accommodating at least a part of the driving shaft, and is coupled to an outer peripheral surface of the driving shaft to idle.

3. The multi-speed transmission according to claim 1, wherein the guide members are disposed coaxially side by side, and
each one guide member comprises:
one coupling hole to which the guide rod is coupled; and
one or more through-holes which are located to be adjacent to the coupling hole, and through which a guide rod coupled with another guide member is able to pass, and
wherein the coupling holes are disposed to be offset from each other.

4. The multi-speed transmission according to claim 1, further comprising:

a shaft cover which is formed to wrap around the transmission shaft, and has a communication hole communicating with the first insertion hole.

5. The multi-speed transmission according to claim 1, further comprising:
   a pull-in member which is disposed on the other side of the guide rod, and selectively pulled into the transmission guide groove.

6. The multi-speed transmission according to claim 5, wherein the pull-in member is formed in a ring shape including a hollow portion, and the hollow portion is coupled to the other side of the guide rod.

7. The multi-speed transmission according to claim 1, wherein the transmission gears comprises:
   a first transmission gear unit engaged with the driving gears; and
   a second transmission gear unit which is disposed coaxially with the first transmission gear unit, and engaged with the driven gears,
   wherein the transmission gears of the first transmission gear unit and the second transmission gear unit have different dimensions from each other.

8. A multi-speed transmission, comprising:
   a driving shaft that rotates as a rotational force is input;
   a plurality of driving gears which are coupled to the driving shaft and rotate by the rotation of the driving shaft;
   a plurality of transmission gears which are engaged with driving gears;
   a transmission shaft which includes a plurality of pawl assemblies that are at least partially moved inward and outward on an outer peripheral surface, is coupled with the transmission gears, and is selectively coupled with at least a part of the transmission gears in accordance with the inward and outward movement of at least a part of the pawl assemblies;
   a transmission control means for selectively controlling the inward and outward movement of at least a part of the pawl assemblies;
   a plurality of driven gears which are engaged with at least a part of the transmission gears;
   a driven shaft which is coupled with the plurality of driven gears and transmits rotational force to an object to be driven; and
   a ratchet that prevents reverse rotation of the driving gears between the plurality of driving gears and has a fixing protrusion formed on an inner peripheral surface thereof,
   wherein among the plurality of driving gears, the driving gears to which the ratchet is fixed is formed so that a fixing part in which a fixing groove, into which the fixing protrusion is inserted, is formed along a circumference protrudes in a lateral direction.

9. The multi-speed transmission according to claim 8, wherein the fixing groove is formed with a step inside, and has a shape in which a first fixing groove of a first depth and a second fixing groove of a second depth formed at a position deeper than the first depth are continuously connected.

* * * * *